May 2, 1967    C. E. PALMER    3,317,110
CONTAINER WITH FOLDED BODY OF CURVILINEAR CROSS SECTION
Filed May 10, 1965    2 Sheets-Sheet 1
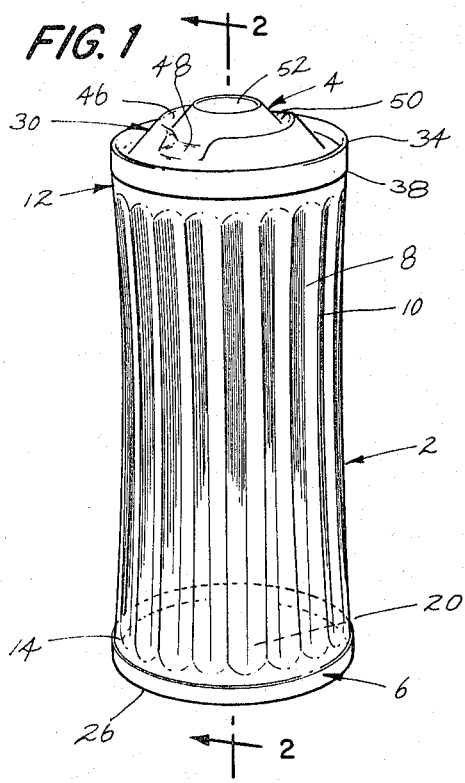
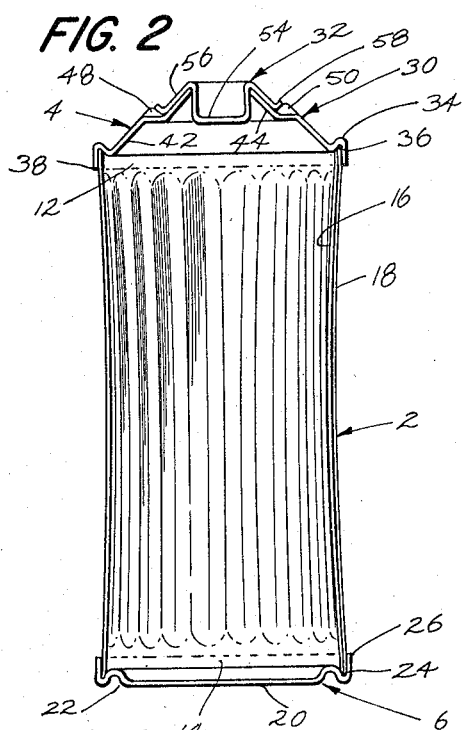
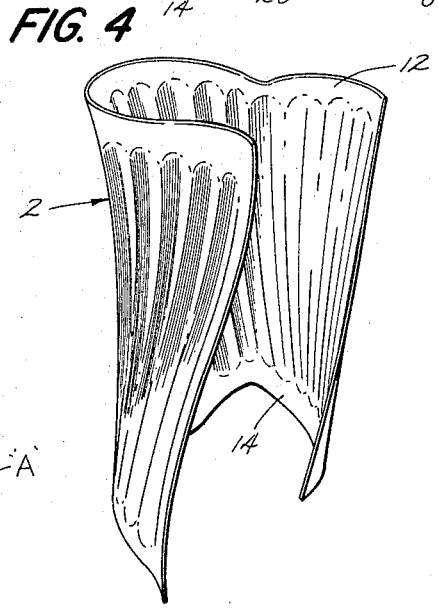
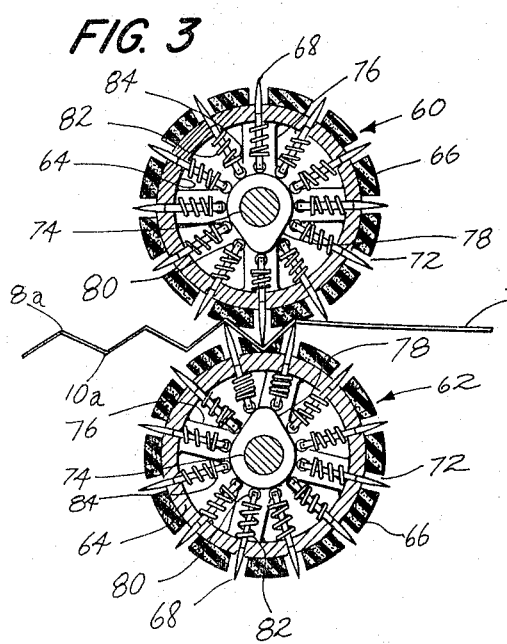
INVENTOR.
CHARLES E. PALMER
BY
*Peter L. Costas*
ATTORNEY

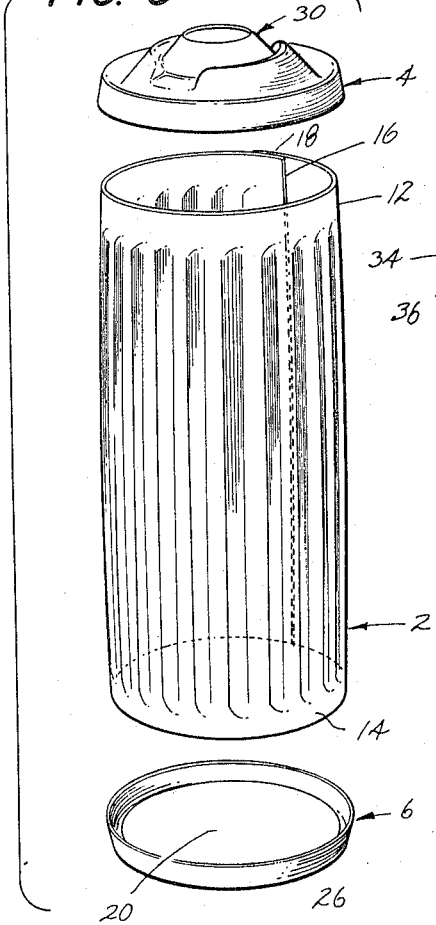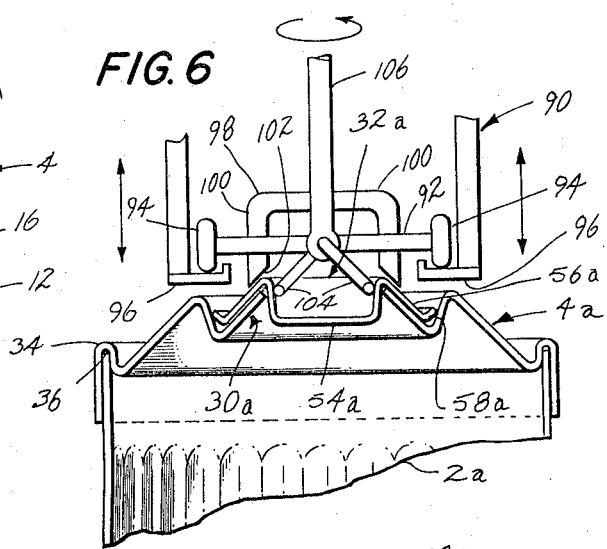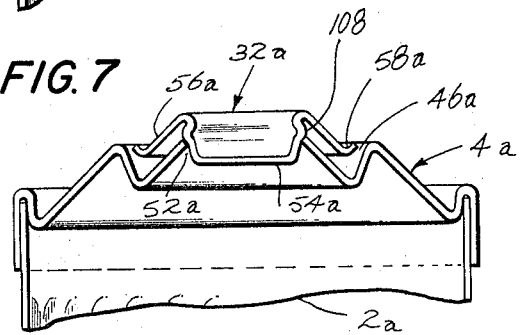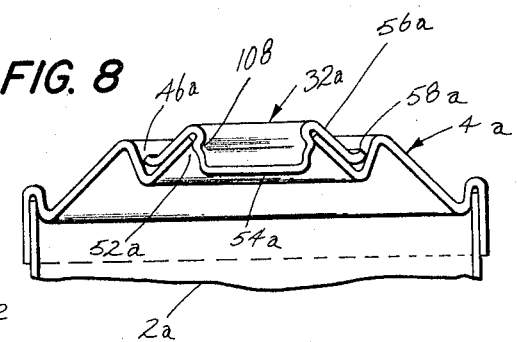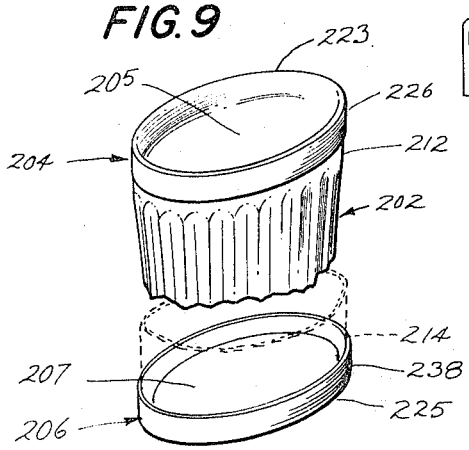

United States Patent Office 3,317,110
Patented May 2, 1967

3,317,110
CONTAINER WITH FOLDED BODY OF CURVILINEAR CROSS SECTION
Charles E. Palmer, Somers, Conn., assignor to Monsanto Company, St. Louis, Mo., a corporation of Delaware
Filed May 10, 1965, Ser. No. 454,456
13 Claims. (Cl. 229—5.5)

The present invention relates to containers and more particularly to novel containers having a body portion of generally curvilinear cross-section formed from semi-rigid synthetic plastic sheet material.

Efforts to utilize synthetic plastic sheet material in containers generally have been hampered by the relative weakness of the material in the transverse dimension in response to pressure exerted by the contents of the container or to crushing pressures upon the ends of the container. It has been recognized that biaxially oriented synthetic plastic sheet material affords high strength and efforts have been made to utilize such material in containers as in applicant's United States Patents Nos. 2,967,654 and 3,019,957. The method of cold-folding biaxially oriented sheet material is disclosed in detail in applicant's United States Patent No. 2,954,725.

It is an object of the present invention to provide a novel container having a body portion of generally curvilinear cross-section formed of synthetic plastic sheet material and having relatively high strength not only in the axial direction but also in the radial direction.

Another object is to provide such a container having a body portion which may be readily and sturdily fabricated from biaxially oriented synthetic plastic sheet material and end closures and which affords wide variation in design.

It is also an object to provide such a container for liquids and the like which strongly resists crushing pressures and expansive pressures internally of the container which operate against the periphery of the body portion.

Other objects and advantages will be readily apparent from the following detailed specification and claims and the attached drawings wherein:

FIGURE 1 is a perspective view of a liquid dispensing container embodying the present invention;

FIGURE 2 is a sectional view thereof along the line 2—2 of FIGURE 1;

FIGURE 3 is a partially diagrammatic view of the apparatus for forming folds within the sheet material comprising the body portion of FIGURE 1;

FIGURE 4 is a perspective view of the sheet material for the body portion of the container of FIGURE 1 after folding in the apparatus of FIGURE 3;

FIGURE 5 is an exploded perspective view of the container of FIGURE 1;

FIGURE 6 is a partially diagrammatic view of the method and apparatus for applying the cap of an alternate embodiment of end closure;

FIGURE 7 is a fragmentary vertical section of the container showing the cap as assembled by the method and apparatus of FIGURE 6;

FIGURE 8 is a similar section of the container of FIGURE 7 showing the cap after removal and reapplication to the closure by the user; and FIGURE 9 is a perspective view of another container embodying the present invention and having an elliptical cross-section.

It has now been found that the foregoing and related objects can be readily obtained in a container having a tubular body element of synthetic plastic sheet material with overlapping side margins and a multiplicity of alternating inward and outward folds therein extending about the periphery thereof. The folds extend axially over the major portion of the length of the body element but terminate inwardly of the ends thereof so as to provide unfolded end portions. End closures are engaged on the end portions of the body element and have a peripheral lip portion adjacent the inner end thereof which abuts against and extends about the cooperating end portion of the body element to urge the end portion into conformity therewith. The lip portion provides a curvilinear abutment which accordingly defines a curvilinear cross-section for the end portion and thereby the length of the body element. The multiplicity of axial folds in the container results in the tapering of the tubular body element inwardly from each end portion to a reduced cross-section intermediate its length, thus providing a configuration approaching an "hourglass" shape.

The theory of operation of the present invention is not fully understood, but it appears that the folds produce a prestressing or tensioning of the body element by reducing the effective width as evidenced by the reduction in cross-section intermediate its length. Because the synthetic plastic sheet material employed in the present invention tends to resist folding and deformation and also has an inherent degree of resiliency, the sheet material is stressed or tensioned in the folded portion whereas the unfolded end portions tend to elongate or open the folds adjacent thereto because of the greater effective length. Since the body element is free between the end closures, the stresses produce the bowing inwardly intermediate the length of the container and result in a significant resistance to deformation of the wall of the container by pressures acting radially outwardly from within. In this manner, significant hoop strength is developed in the container; and this tends to increase the resistance to crushing by pressures applied axially upon the ends of the container.

To achieve the desired effect, the body of the container must be of curvilinear cross section; i.e., it must not have any corners. Although the preferred containers are of circular cross section, other curvilinear cross sections such as that of an ellipse may also be employed, but care must be taken to avoid any sharp radius which might produce excessive stresses thereat.

The folds in the side of the body element should extend over at least one-half the length thereof, and preferably over at least three-fourths the length thereof, and terminate closely adjacent to the lower portions of the closure members which are mounted thereon. Generally, an unfolded end portion of about ⅛ to 1 inch is satisfactory, although about ¼ to ¾ inch is most desirably employed to facilitate conforming and bonding the closures commensurate with developing the desired strength.

The folds in the body element alternate inwardly and outwardly at a spacing which will be dependent to some degree upon the diameter or width of the container. Generally, however, the folds will be spaced apart about ⅛ to 1 inch, and preferably about ³⁄₁₆ to ⁹⁄₁₆ inch. A highly satisfactory dimension for most applications has been found to be ¼ inch. The degree of sharpness in the fold will also be dependent upon the material and the amount of corrugation desired. For most applications, an included angle of about 75 to 135 degrees will be satisfactory, and about 85 to 115 degrees is most desirable.

The synthetic plastic sheet material is readily cold folded in the manner disclosed and claimed in applicant's United States Patent No. 2,954,725 entitled, Method and Apparatus for Folding Plastic Sheet Stock. Herein a rigid folding blade cooperates with a die pad of resiliently deformable material so that when the folding blade presses a length of synthetic plastic sheet stock down into the die pad, the material thereof deforms or flows to press the sheet stock against the side faces of the blade edge and thereby to establish a permanent fold therein.

The synthetic plastic sheet material employed for the body element should be semi-rigid with sufficient flexibility to accommodate stresses and impacts during normal usage. As indicated, the material should be foldable about a relatively sharp angle of fold. Exemplary of such materials are biaxially oriented polystyrene, polyvinyl chloride and polyvinyl chloride-acetate copolymer. However, materials which cannot be so sharply folded may also be employed albeit with greater difficulty in control and operation such as cellulose acetate and butyrate. The most desirable material utilized to date has been biaxially oriented polystyrene of about 4 to 15 mils in thickness because of its clarity, high strength, economy and semi-rigidity, coupled with sufficient resiliency and flexibility to provide desirable folds and resistance to normal impacts.

Although the overlapping side margins of the body element may be held in overlapping relationship merely by the end closures in containers of relatively small height, generally it is necessary to provide some form of adhesion therebetween. Any suitable means may be employed including solvent sealing, heat sealing and an interposed coating of adhesive depending upon the material being employed. From the standpoint of ensuring a liquid-tight seal, generally it may be desirable to apply a separate coating of adhesive which will also act as a liquid sealant.

The end closures may have a variety of configurations, it being necessary only that they function as closures and that they provide some form of circumferential lip or abutment wall which will abut against and extend about the cooperating end portion of the body element to urge the end portion into conformity therewith. Since the end portion is unfolded, its smooth surface can be urged into close-fitting surface contact with the lip or abutment; and this, accordingly, determines the configuration of the end portion and thereby the entire length of the body element. From the standpoint of achieving a good seal and firm definition of configuration, the end closures desirably have a channel to receive the end portions of the body element, and the walls defining the channel thereby provide the lips or abutments which hold the end portions in the desired configuration. However, a single lip or flange fitting internally or externally of the end portion of the body element may also be utilized albeit with lesser effectiveness so long as firm surface contact and engagement of the lip and the end portion are provided. Although the end closures may be frictionally seated upon and secured to the end portions as by heat shrinking the closure member thereon, generally it is desirable to provide firm adhesion therebetween by any suitable means such as solvent sealing, heat sealing and an interposed coating of adhesive, depending upon the nature of the materials employed. From the standpoint of providing maximum adhesion and a highly effective liquid container, a cap member providing a channel most desirably is employed and a separate adhesive is inserted into the channel so as not only to bond the end closures to the body element but also to function as a liquid sealant.

The end closures may assume a number of forms, it being necessary only that the lip or abutment wall be curvilinear so as to define the desired curvilinear configuration to the body element. Thermoforming of the end closures has proven particularly advantageous in permitting a wide variety of design. In addition, the end closures may be fabricated from more than one piece as in the case of dispenser closures which are provied with a removable cap for the dispensing aperture. However, it is also possible to fabricate the end closures by injection molding, compression molding and other techniques albeit at greater cost.

Various materials may be used in fabricating the end closures depending upon the technique of fabrication desired, the materials to be received within the container and the compatibility thereof with the material of the body element. Among the various materials which may be employed are polystyrene, polypropylene, polyvinyl chloride, polyvinyl chloride-acetate copolymer and polyethylene. The thickness of the closure member will be dependent upon the nature of the material selected and the technique of fabrication employed. Thermoformed closure members of biaxially oriented polystyrene having a thickness of 5 to 20 mils have been found highly satisfactory.

Referring now in detail to FIGURES 1 and 2 of the attached drawings, therein illustrated is a liquid dispensing container embodying the present invention and having a tubular body element generally designated by the numeral 2 and fabricated from semirigid synthetic plastic sheet material. A dispensing end closure generally designated by the numeral 4 and a bottom end closure generally designated by the numeral 6 are engaged on the ends of the body element 2 to provide the end closures therefor and define the container configuration as will be pointed out more in detail hereinafter.

The body element 2 has a multiplicity of alternating inward folds 8 and outward folds 10 extending about the periphery thereof and axially over the major portion of the length of the body element but terminating inwardly of the ends thereof to provide end portions 12, 14 which are free from folds. The overlapping side margins 16, 18 are secured together in overlapping relationship by any means suitable for the sheet material employed such as solvent sealing, heat sealing or an interposed coating of adhesive.

The bottom end closure 6 is of circular cross section and has a generally planar bottom wall portion 20 and a reversely curved circumferential portion 22 providing an upwardly opening channel 24 which receives the lower end portion 14 of the body element 2 and the outer leg or lip portion 26 thereof abuts against and extends about the outer periphery of the body element 2 to provide a circular abutment urging it into conformity therewith. Water-proof adhesive (not shown) is desirably interposed between the adjacent surfaces of the circumferential portion 22 and the end portion 14 to provide a firm bond therebetween and to act as a liquid sealant although solvent sealing, heat sealing and other means of effecting firm engagement therebetween may be employed.

The upper end closure 4 is a dispensing or pouring device comprised of a closure member and cap generally designated by the numerals 30 and 32 respectively. The closure member 30 is of generally circular cross section with a complex configuration readily fabricated by thermoforming and has circumferential reversely curved portion 34 with a downwardly opening circumferential channel 36 which receives the end portion 12 of the body element 2. The outer lip portion of skirt 38 of the portion 34 extends about the outer periphery of the end portion 12 of the body element 2 to provide a circular abutment urging it into conformity therewith. As in the case of the bottom end enclosure 6, a waterproof adhesive (not shown) is desirably provided for a firm bond between the two elements and as a liquid sealant.

The body of the closure member 30 is formed with stepped inner and outer generally conically extending wall portions 42, 44 which are interconnected to define a generally V-shaped channel 46 provided therebetween. The outer wall portion 42 has a pair of diametrically spaced, radially extending generally U-shaped pour slots 48, 50 therein which are dimensioned and configured so that the base portion thereof is spaced below the channel 46 for free passage of fluid therethrough to facilitate pouring and to avoid entrapment of fluid in the channel 46.

At its center and at the top of the wall portion 44 the closure member 30 has a circular dispensing aperture 52 into which snugly fits the generally cylindrical plug portion 54 of the cap 32. A generally conically extending skirt 56 extends downwardly from the top of the plug portion 54 and cooperates with the taper of the inner wall portion 44 so as to fit closely thereagainst and has a generally radially extending or slightly reversely curved circumferential rim 58 which seats within the channel 46 and which may be readily used as a means for lifting the cap 32 from the closure member 30.

A method and apparatus for forming the inward and outward folds in the body element 2 is diagrammatically illustrated in FIGURE 3 wherein a length of synthetic plastic sheet material A is passed into the nip of a pair of rotating folding drums generally designated by the numerals 60, 62. Each of the drums 60, 62 has a cylindrical support element 64 upon the outer periphery of which is mounted resiliently deformable, rubber-like material 66 to provide a resiliently deformable die pad cooperating with the folding blades 68 of the other folding drum. The support element 64 is provided with elongate slots 70 therein in which slidably seat the folding blade members 68 and the resiliently deformable material 66 has cooperating slots 72 therein for passage of the blades therethrough.

The support element 64 rotates with the shaft 74 as indicated by the support struts 76 but the cam member 78 is fixedly mounted in the apparatus frame (not shown). As seen, the cam member 78 is elongated toward the nip between the drums 60, 62 so as to be more closely spaced to the inner surface of the support element 64. Each of the blade members 68 has a cam follower 80 at its inner end which rides upon the cam member 78 as the shaft 74 rotates and the blade members 68 are projected through the slots 70, 72 by the cam member 78 at the nip. During continuing rotation, the blade members 68 are drawn inwardly by the return springs 82 thereabout which operate between the washers 84 and the inner surface of the support element 64.

As more fully described in applicant's aforementioned United States Patent No. 2,954,725, the folding blade member 68 presses the length of synthetic plastic sheet material A into the resiliently deformable material 66 and causes the deformable material 66 to flow or deform and fold the synthetic plastic sheet material tightly about the blade edge and against the sides thereof and establish a permanent fold therein at the blade edge. The shape of the folding blade members 68 and the included angle of the blade edge which will define the angle to which the sheet material is folded will be dependent upon the particular sheet material selected and the included angle desired in the folds 8, 10 of the body element 2.

As can be seen, the blade members 68 of the two drums 60, 62 align with the resiliently deformable material 66 of the opposing drum. In this manner, the direction of the folds will alternate as the drums 60, 62 are rotated and the length A passes therebetween.

The blade members 68 are of lesser length than the width of the length A so that the folds 8, 10 will terminate inwardly of the margins to provide the desired unfolded end portions 12, 14. After being folded in the apparatus and method of FIGURE 3, the length of sheet material A is subjected to tension or stresses by the folds 8, 10 so that it assumes a distorted configuration such as that shown in FIGURE 4.

In assembling the container, the folded length A shown in FIGURE 4 is pressed about a mandrel of the desired cross-sectional configuration (not shown) and the overlapping side margins 16, 18 are secured together by any suitable means. One of the end closures 4, 6 is then inserted over one of the end portions 12, 14 and secured thereto after which the mandrel is withdrawn. The end closure is then mounted over the other end portion and secured thereto.

Generally, there must be provided to sidewalls of elements made in thermoforming operations a taper to permit facile forming and withdrawal of the molded element from the die. This taper is illustrated in the exploded illustration of the elements in FIGURE 5 wherein the thermoformed end closures 4, 6 have slightly outwardly tapering lip portions 26, 38. Since it is desirable that these lip portions 26, 38 closely overlie the surface of the body element 2, the material employed preferably is heat-shrinkable so that the application of heat thereto after assembly to the body element 2 will shrink the lip portions 26, 38 tightly against the surface of the body element 2 while initially during assembly the taper may be used as a guide surface for the ends of the body element to facilitate their seating within the channels 24, 36.

Although the functional engagement of the plug portion 54 of the cap 32 within the aperture 52 of the closure member 30 will be satisfactory for most applications, a positive mechanical engagement is provided in the end closure embodiment illustrated in FIGURES 6–8 and generally designated 4a. As shown diagrammatically in FIGURE 6, a sealing device having a frame generally designated by the numeral 90 is guided to position over the end closure with the cap 32a seated in the closure member 30a, and the support bar 92 therein has end guides 94 which seat against the flanges 96 of the frame 90. Mounted thereon is a generally U-shaped member 98 which provides arms 100 with end surfaces 102 having a taper cooperating with that of the skirt 56a. A pair of inner arms 104 are pivotally mounted for movement radially outwardly and inwardly in response to axial or vertical movement of the rod 106 so as to press against the wall of the plug portion 54a. Both the inner arms 104 and the arms 100 are heated, conveniently by resistance heating, so that rotation thereof when pressed against the adjacent surfaces of the plug portion 54a and skirt 56a will result in the formation of a circumferential, radially outwardly extending bead 108 on the plug portion 54a below and of greater diameter than the aperture 52a as seen in FIGURE 7.

Because of the resilient flexibility of the cap 32a and closure member 30a, the cap 32a may still be removed therefrom by applying sufficient lifting pressure upon the rim 58a to produce the necessary deflection. Although the user may desire to reestablish this firm lock by repressing the cap 32a onto the closure member 30a with sufficient force, generally for most uses it is sufficient merely to seat the cap 32a snugly by use of the lower surface of the bead 108 as seen in FIGURE 8.

In FIGURE 9, there is illustrated another container embodying the present invention and having an elliptical cross section defined by end closures generally designated 204, 206 of elliptical configuration seated on the unfolded end portions 212, 214 of the body element generally designated 202. As in the preceding embodiments, internal channels (not shown) formed by the generally U-shaped peripheral portions 223, 225 and the lip portions 226, 238 thereof restrain the end portions 212, 214 against the deforming stresses produced by the folds 208, 210. In this embodiment, the end closures 204, 206 have generally planar central wall portions 205, 207 which are unapertured so that they must be punctured or removed to remove the contents of the container.

Thus it can be seen from the foregoing detailed specification and the attached drawings that the container of the present invention has enhanced strength in the radial direction and resistance to crushing by pressures applied axially. The container may be readily and sturdily fabricated of synthetic plastic sheet material and affords wide variation in design potential in the use of synthetic plastic sheet material. The method for forming the container is relatively facile and economical and permits wide variety in design through the use of separately formed components which may be readily assembled. The apparatus for the manufacture of the body elements is relatively simple and economical to construct and may be operated at high speeds to provide the desired tubular body elements and finished containers in packaging lines.

Having thus described the invention, I claim:

1. A container comprising a tubular body element of semi-rigid synthetic plastic sheet material having overlapping side margins and a multiplicity of alternating inward and outward folds therein extending about the entire periphery thereof and providing outwardly diverging channels between said inward folds, said folds extending axially over at least the major potrion of the length of said body element but terminating inwardly of the ends thereof to provide unfolded end portions; end closures engaged on said unfolded end portions of said body element, said end closures each having a peripheral lip portion adjacent the inner end thereof which abuts against and extends about the cooperating end portion of said body element to urge said end portion into conformity therewith, said lip portion providing a curvilinear abutment and defining a curvilinear cross section for said end portions and thereby the length of said body element, said tubular body element tapering from each end portion to a reduced cross section intermediate its length; means adhesively engaging said end closures to said end portions of said body element.

2. The container of claim 1 wherein said container and said lip portions of said end closures are of generally circular cross section.

3. The container of claim 1 wherein said sheet material of said body element is biaxially oriented polystyrene of about 4 to 15 mils in thickness.

4. The container of claim 1 wherein one of said end closures is comprised of a closure element having an aperture therein and a cap element engageable therewith to seal said aperture.

5. The container of claim 1 wherein said end closures have opposed generally U-shaped channels on the inner ends thereof extending circumferentially thereabout and providing said circumferential lip portions, and wherein said end portions of said body element are snugly seated within said channels.

6. A container comprising a tubular body element of semi-rigid synthetic plastic sheet material having overlapping side margins and a multiplicity of alternating inward and outward folds therein extending about the entire periphery thereof and providing outwardly diverging channels between said inward folds, said folds extending axially over at least the major portion of the length of said body element but terminating inwardly of the ends thereof to provide unfolded end portions; a bottom end closure engaged on the lower end portion of said body element and having a peripheral lip portion adjacent the inner end thereof which abuts against and extends about the cooperating end portion of said body element to urge said end portion into conformity therewith, said lip portion providing a curvilinear abutment and defining a curvilinear cross section for the cooperating end portion; and a dispensing end closure comprised of a closure element and a cap element, said closure element being engaged on the upper end portion of said body element and having a peripheral lip portion adjacent the inner end thereof which abuts against and extends about the cooperating end portion of said body element to urge said end portion into conformity therewith, said lip portion providing a curvilinear abutment and defining a curvilinear cross section for said cooperating end portion, said dispensing end closure cooperating with said bottom end closure to define a curvilinear cross section over the length of said body element, said body element tapering from each end portion to a reduced cross section intermediate its length, said closure element having a pair of stepped generally conically extending portions extending upwardly and inwardly from the periphery thereof and defining a generally V-shaped channel therebetween, said closure element having an aperture in the apex of the inner of said stepped generally conically extending portions, said cap element having a plug portion seated snugly within said aperture and a peripheral skirt portion overlying the outer surface of the inner of said conically extending portions with a circumferential rim thereon disposed within said channel for engagement by the user to remove the cap element from said closure element.

7. The container of claim 6 wherein said closure element has a generally U-shaped channel extending radially through the inner of said generally conically extending portions to provide a pouring spout for said closure element and facile engagement of said rim.

8. The container of claim 6 wherein said bottom end closure and said closure element have opposed generally U-shaped channels extending circumferentially thereabout and providing said circumferential lip portions, and wherein said end portions of said body element are snugly seated within said channels.

9. The container of claim 1 wherein said end closures have opposed generally U-shaped channels extending circumferentially thereabout and providing said circumferential lip portions, and wherein said end portions of said body element are snugly seated within said channels and wherein said adhesively engaging means is provided within said channels and acts as a liquid sealant for said container.

10. The container of claim 6 wherein said plug portion of said cap element has a generally radially outwardly extending bead thereon spaced below and of greater diameter than said aperture in said closure element.

11. A container comprising a tubular body element of semi-rigid synthetic plastic sheet material having overlapping side margins and a multiplicity of alternating inward and outward folds therein extending about the entire periphery thereof and providing outwardly diverging channels between said inward folds, said folds extending axially over at least the major portion of the length of said body element but terminating inwardly of the ends thereof to provide unfolded end portions; a bottom end closure engaged on the lower end portion of said body element and having a generally U-shaped channel of curvilinear configuration which receives the cooperating end portion of said body element to urge said end portion into conformity therewith and to define a curvilinear cross section for the cooperating end portion; a dispensing end closure comprised of a closure element and a cap element, said closure element being engaged on the upper end portion of said body element and having a generally U-shaped channel of curvilinear configuration in the inner end thereof which receives the cooperating end portion of said body element to urge said end portion into conformity therewith and to define a curvilinear cross section for the cooperating end portion, said dispensing end closure cooperating with said bottom end closure to define a curvilinear cross section over the length of said body element, said body element tapering from each end portion to a reduced cross section intermediate its length, said closure element having a pair of stepped generally conically extending portions extending upwardly and inwardly from the periphery thereof and defining a generally V-shaped channel therebetween, said closure element having an aperture in the apex of the inner of said stepped generally conically extending portions, said cap element having a plug portion seated snugly within said aperture and a peripheral skirt portion overlying the outer surface of the inner of said conically extending portions with a circumferential rim thereon disposed within said channel for engagement by the user to remove the cap element from said closure element; and means adhesively engaging said end closures to said end portions of said body element and adhesively engaging said overlapping side margins of said body element, said adhesively engaging means being provided within said channels and acting as a liquid sealant for said container.

12. The container of claim 11 wherein said closure element has a generally U-shaped channel extending radially through the inner of said generally conically extending portions to provide a pouring spout for said closure element and facile engagement of said rim.

13. The container of claim 11 wherein said plug portion of said cap element has a generally radially outwardly extending bead thereon spaced below and of greater diameter than said aperture in said closure element.

References Cited by the Examiner
UNITED STATES PATENTS

| | | | |
|---|---|---|---|
| 1,469,067 | 9/1923 | Coates | 229—5.5 |
| 2,309,341 | 1/1943 | Condon | 229—4.5 |
| 2,330,840 | 10/1943 | O'Neil et al. | 229—4.5 |
| 2,340,473 | 2/1944 | Johnson | 229—4.5 |
| 2,457,198 | 12/1948 | Bell | 229—4.5 |
| 2,954,725 | 10/1960 | Palmer | 93—51 |
| 2,967,654 | 1/1961 | Palmer | 229—35 |
| 2,982,458 | 5/1961 | Hennion | 229—4.5 |

JOSEPH R. LECLAIR, *Primary Examiner.*

DAVIS T. MOORHEAD, *Examiner.*